(12) United States Patent
Chang et al.

(10) Patent No.: US 7,936,948 B2
(45) Date of Patent: May 3, 2011

(54) SYSTEM AND METHOD FOR MERGING DIFFERENTLY FOCUSED IMAGES

(75) Inventors: Chih-Kuang Chang, Taipei Hsien (TW); Xiao-Chao Sun, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1002 days.

(21) Appl. No.: 11/757,400

(22) Filed: Jun. 4, 2007

(65) Prior Publication Data
US 2008/0131027 A1   Jun. 5, 2008

(30) Foreign Application Priority Data
Dec. 1, 2006   (CN) .......................... 2006 1 0157199

(51) Int. Cl.
*G06K 9/32* (2006.01)
(52) U.S. Cl. .......................................................... 382/294
(58) Field of Classification Search .......... 382/141–152, 382/294
See application file for complete search history.

(56) References Cited

U.S. PATENT DOCUMENTS

| | | | | |
|---|---|---|---|---|
| 4,661,986 A * | 4/1987 | Adelson | ........................ | 382/154 |
| 5,511,155 A * | 4/1996 | Yamaguchi | .................... | 345/643 |
| 6,075,883 A * | 6/2000 | Stern et al. | .................... | 382/144 |
| 6,075,905 A * | 6/2000 | Herman et al. | ............... | 382/284 |
| 6,094,511 A * | 7/2000 | Metcalfe et al. | .............. | 382/260 |
| 6,323,858 B1 * | 11/2001 | Gilbert et al. | ................. | 345/419 |
| 6,493,469 B1 * | 12/2002 | Taylor et al. | .................. | 382/284 |
| 6,724,937 B1 * | 4/2004 | Wu et al. | ....................... | 382/190 |
| 7,295,720 B2 * | 11/2007 | Raskar | .......................... | 382/312 |
| 2002/0181762 A1 * | 12/2002 | Silber | ........................... | 382/154 |
| 2004/0165110 A1 * | 8/2004 | Peters et al. | .................. | 348/441 |
| 2006/0114358 A1 * | 6/2006 | Silverstein et al. | ........... | 348/616 |
| 2006/0115178 A1 * | 6/2006 | Fan et al. | ...................... | 382/275 |

OTHER PUBLICATIONS

Bitmap file format information, GPWiki, 20051126131911, 2005, web-archieve, pp. 1-3.*
VB tutorials Bitmap file format info, GPWiki, 20051126131911, 2005, webarchive, pp. 1-3.*
VB tutorials Bitmap file format info, GPWIKI, 20051126131911, 2005, Webarchieve, pp. 1-3.*

(Continued)

*Primary Examiner* — Samir A Ahmed
*Assistant Examiner* — Jayesh Patel
(74) *Attorney, Agent, or Firm* — Frank R. Niranjan

(57) ABSTRACT

A system for merging differently focused images includes a computer for including a merge images program which includes a read module for reading a plurality of the differently focused images of an object disposed on a platform of a measuring machine, one image thereof as a first image (BMP), another image thereof as a next image (BMP0), and reading gray values of pixels and computing a gradient of each pixel; a determining module for determining whether the gradient (G) of each pixel in the BMP is less than the gradient (G0) of a corresponding pixel in the BMP0; and a merge images module for updating/replacing the gray value (P) and the G of the pixel in the BMP with the gray value (P0) and the G0 of the corresponding pixel in the BMP0 if the G of the pixel in the BMP is less than the G0 of the corresponding pixel in the BMP0. A related method is also provided.

13 Claims, 11 Drawing Sheets

OTHER PUBLICATIONS

Gradient-Based multiresolution image fusion, Petrovic' et al., IEEE,1057-7149,2004, pp. 228-237.*

Combination of images—spatial frequency, Li et al., Elsevier, 1566-2535,2001, pp. 169-176.*

* cited by examiner

| Type | Size | Data Offset | Count |

SYSTEM AND METHOD FOR MERGING DIFFERENTLY FOCUSED IMAGES

BACKGROUND OF THE INVENTION

1. Field of the Invention

The present invention relates to a system and method for merging differently focused images.

2. Description of Related Art

A charged coupled device (hereinafter, "the CCD") is an electrical device that is used to capture images of objects, or transfer electrical charges. It receives light reflected by an object as an optical input and takes the optical input and converts it into an electrical signal to output. The electrical signal is then processed by another equipment and/or software to either produce an image or to provide valuable information.

CCDs are used in a variety of different imaging devices, such as imagers, CCD cameras or scanners. The CCD is only a light-sensitive integrated circuit that stores and displays the data for an image in such a way that each pixel (picture element) in the image is converted into an electrical charge the intensity of which is related to a color in the color spectrum. So, an optical lens is required to properly focus the incident radiation from the object onto an array during a process of capturing the images of the objects.

A manual-focusing measuring machine generally includes a manual focusing apparatus for adjusting the optical lens to focus on the object, so as to obtain clear the images of the object for measurement. Compared to an auto-focusing measuring machine, the manual-focusing measuring machine has its advantages of lower-cost and simpler structure. However, the manual-focusing measuring machines can only capture differently focused images when the manual-focusing measuring machine focuses the object with multiple layers that heights of each parts of the object are different from the Z-axis or each layer of the object is not arranged in the same level. As a result, each of the images has part in focus.

What is needed, therefore, is a system and method for merging images of different focuses of an object with segment difference so as to merge the images of different focuses into an image in focus.

SUMMARY OF THE INVENTION

A system for merging images focuses includes: a measuring machine and a computer for obtaining a plurality of the differently focused images of an object disposed on the measuring machine. The computer includes a merge images program; the merge images program includes a read module, a determining module, and a merge images module. The read module is configured for reading the plurality of the differently focused images of the object disposed on the measuring machine, selecting an image of the plurality of the differently focused images as a first image, selecting another image of the plurality of the differently focused images as a next image, reading gray values of the pixels and computing a gradient of each pixel according to the gray values; the determining module is configured for determining whether the gradient of each of the pixels of the first image is less than the gradient of a corresponding pixel of the next image, determining whether the next image is a last image, and determining whether the read pixel is a last pixel of the first image; the merge images module is configured for updating/replacing the gray value and the gradient of the pixel of the first image with the gray value and the gradient of the corresponding pixel of the next image if the gradient of the pixel of the first image is less than the gradient of the corresponding pixel of the next image; and keeping the gray value and the gradient of the pixel of the first image if the gradient of the pixel in the first image is greater than or equals to the gradient of the corresponding pixel in the next image; thereby obtaining a merged image.

A computer-based method for merging images focuses includes the steps of: reading a plurality of the differently focused images of an object with multiple layers, the object being disposed on a measuring machine; selecting one of the differently focused images as a first image; selecting another one of the differently focused images as a next image; reading a gray value (P) and a gradient (G) of a pixel from the first image; reading the gray value (P0) and the gradient (G0) of a corresponding pixel from the next image; updating/replacing the gray value of the pixel of the first image with the gray value (P0) of the corresponding pixel of the next image and updating the gradient of the pixel of the first image with the gradient (G0) of the corresponding pixel of the next image if the gradient (G) of the pixel of the first image is less than the gradient (G0) of the corresponding pixel of the next image; keeping the gray value (P) and the gradient (G) of the pixel of the first image if the gradient (G) of the pixel of the first image is greater than or equals to the gradient (G0) of the corresponding pixel of the next image; returning to the step of reading the gray value (P) and the gradient (G) of the pixel from the first image until all of the pixels of the first image are either kept or replaced; and returning to the step of selecting another one of the differently focused images as the next image until reading over all the images.

BRIEF DESCRIPTION OF THE DRAWINGS

FIG. 2 is a block diagram of a file header of the compressed file of the preferred embodiment;

Figure 6:
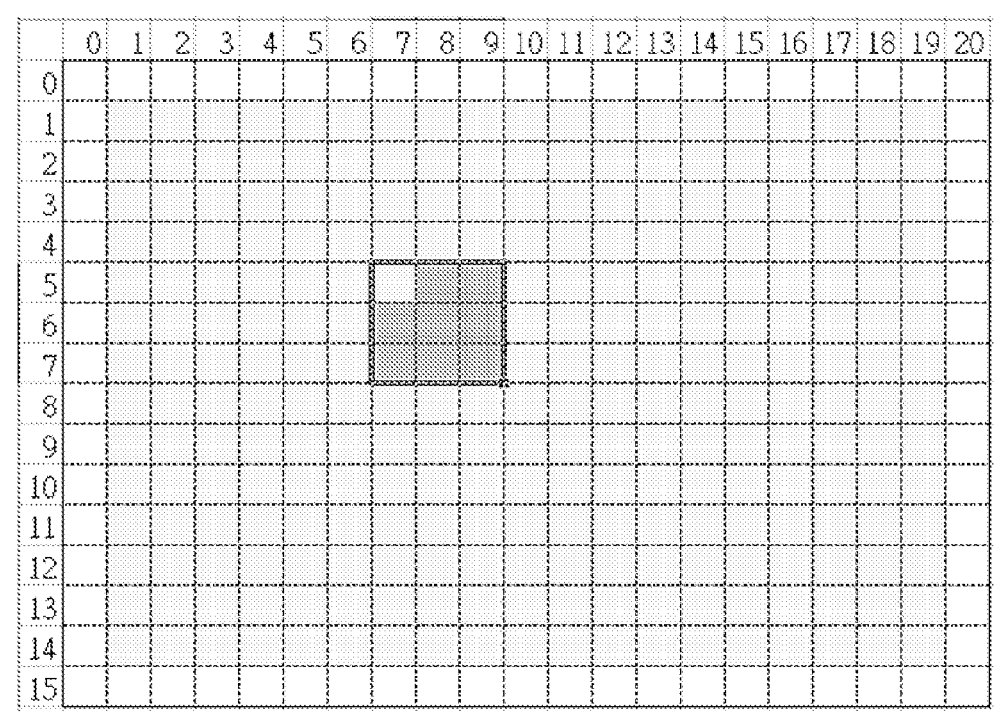

FIG. 6 is a sketch map illustrating step S46 of FIG. 4, namely filtering rough edges;

DETAILED DESCRIPTION OF THE INVENTION

Figure 1:
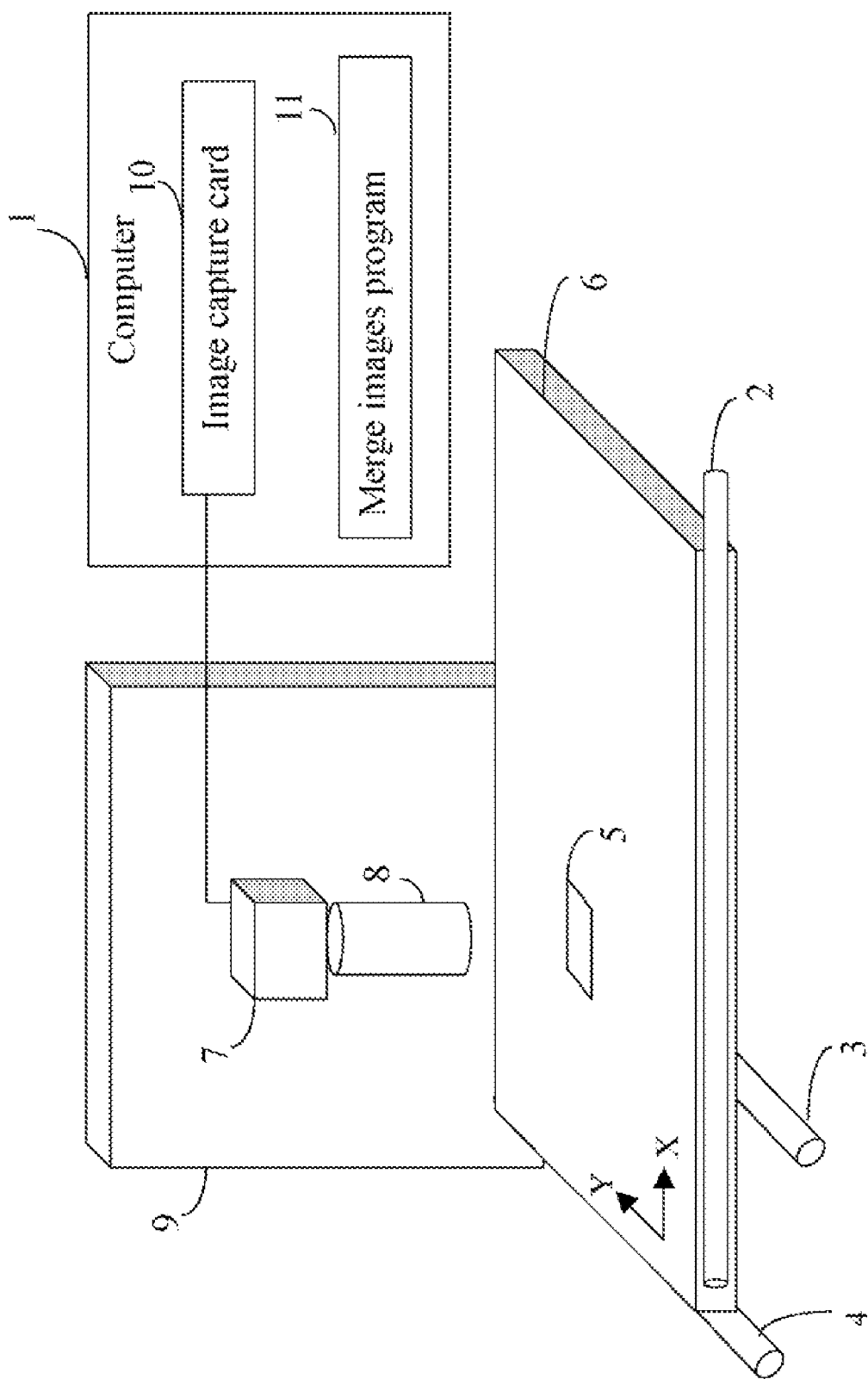
FIG. 1 is a schematic diagram of hardware configuration of a system for merging differently focused images in accordance with a preferred embodiment.

FIG. 1 is a schematic diagram of hardware configuration of a system for merging differently focused images in accordance with a preferred embodiment. The system includes a computer 1 and a measuring machine 9 with an object 5 laid thereon for measurement. The measuring machine 9 includes a charged coupled device 7 (hereinafter, the "CCD 7"), an optical lens 8, a first lever 2, a second lever 3, a third lever 4, and a platform 6.

The charged coupled device 7 (hereinafter, the "CCD 7") is installed on a Z-axis of the measuring machine 9. The CCD 7 is used for capturing a series of images of the object 5 disposed on the platform 6 via the optical lens 8 that is installed in front of the CCD 7. Furthermore, the third lever 4 is installed on the Z-axis of the measuring machine 9 for manually focusing the optical lens 8 on the object 5. The first lever 2 is installed on an X-axis of the measuring machine 9 for manually controlling the platform 6 to move along the X-axis. The second lever 3 is installed on a Y-axis of the measuring machine 9 for manually controlling the platform 6 to move along the Y-axis. The object 5 moves along with the platform 6 correspondingly.

The computer 1 includes an image capture card 10 and a merge images program 11. The CCD 7 is connected with the image capture card 10 via a data bus. When the third lever 4 is operated to focus the optical lens 8 on the object 5, and the first lever 2 and the second lever 3 are operated to move the platform 6, the CCD 7 transmits electrical signals of the series of the differently focused images of the object 5 to the image capture card 10 through the data bus. The merge images program 11 is used for merging the differently focused images of the object 5 into an image in focus.

The system may also include a display unit (not shown) connected to the computer 1. The display unit provides an interface for receiving instructions input by a user, sending the instructions to the computer 1 to capture the series of the differently focused images of the object 5 via the image capture card 10, and for displaying the images of the object 5 to the user.

Figure 7:
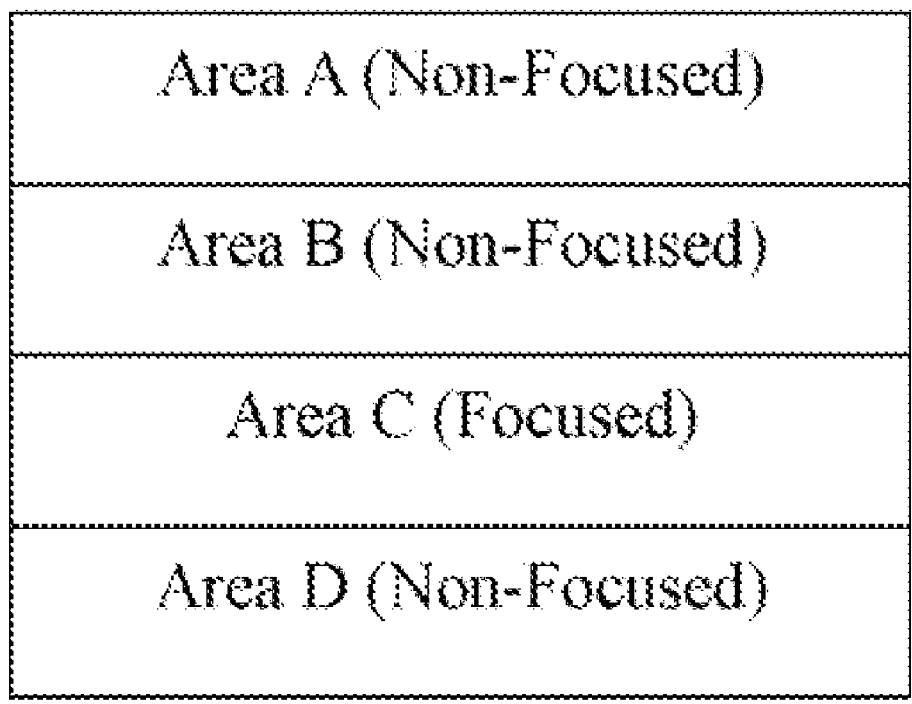
FIG. 7, FIG. 8, FIG. 9, and FIG. 10 are four schematic maps showing differently focused images of a same object.
Figure 8:
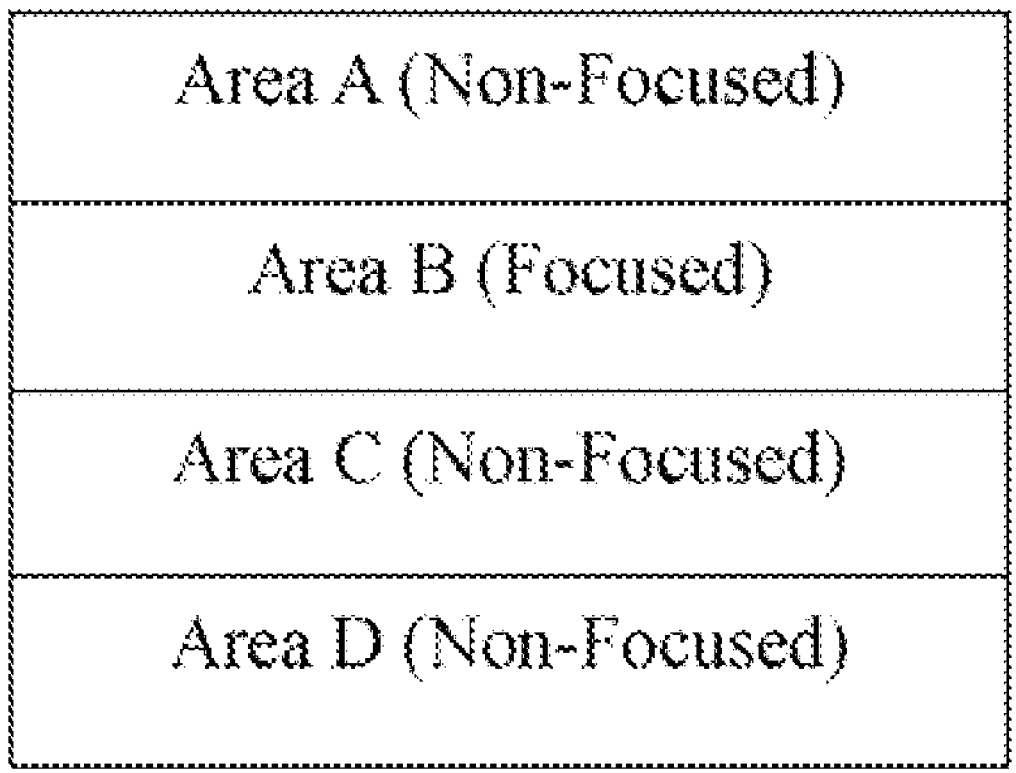
Figure 9:
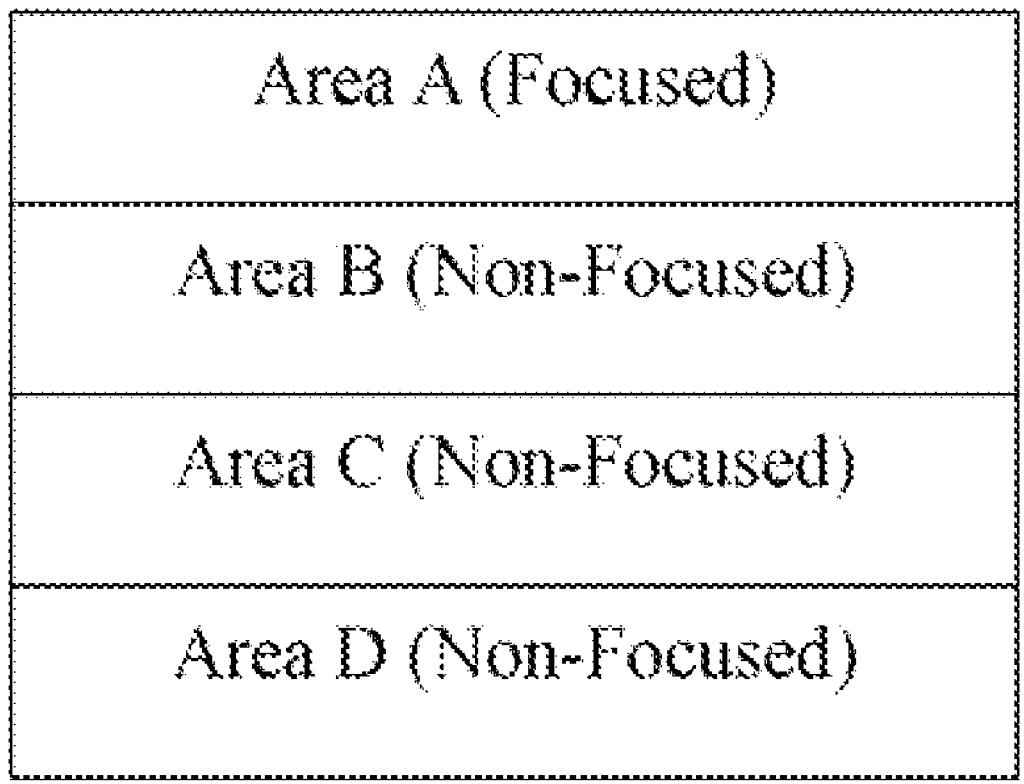
Figure 10:
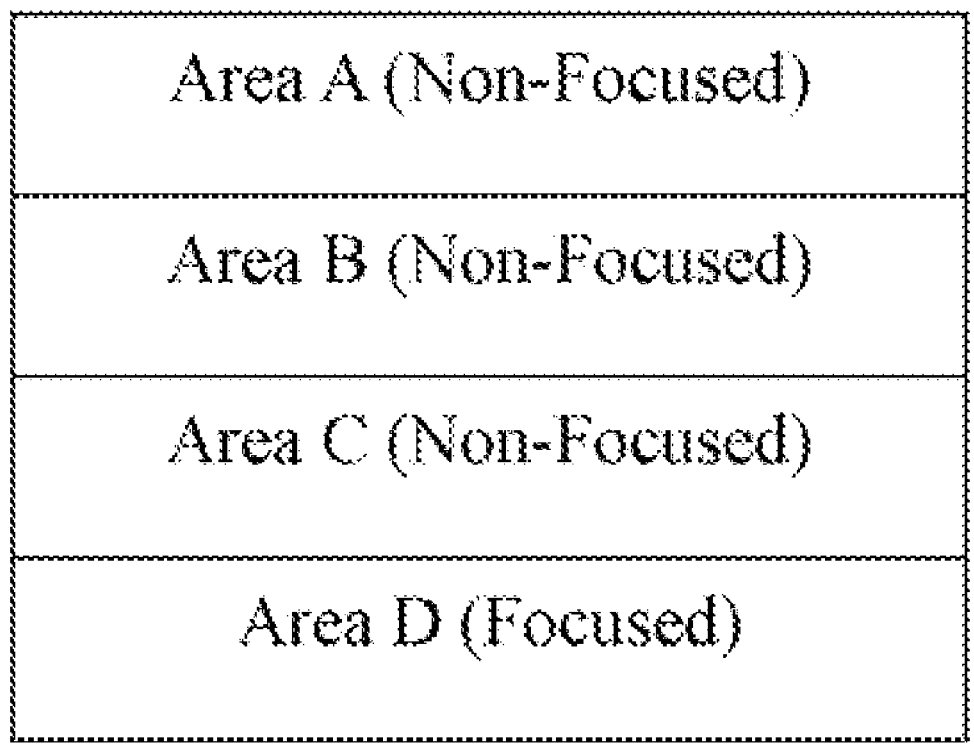
Figure 11:
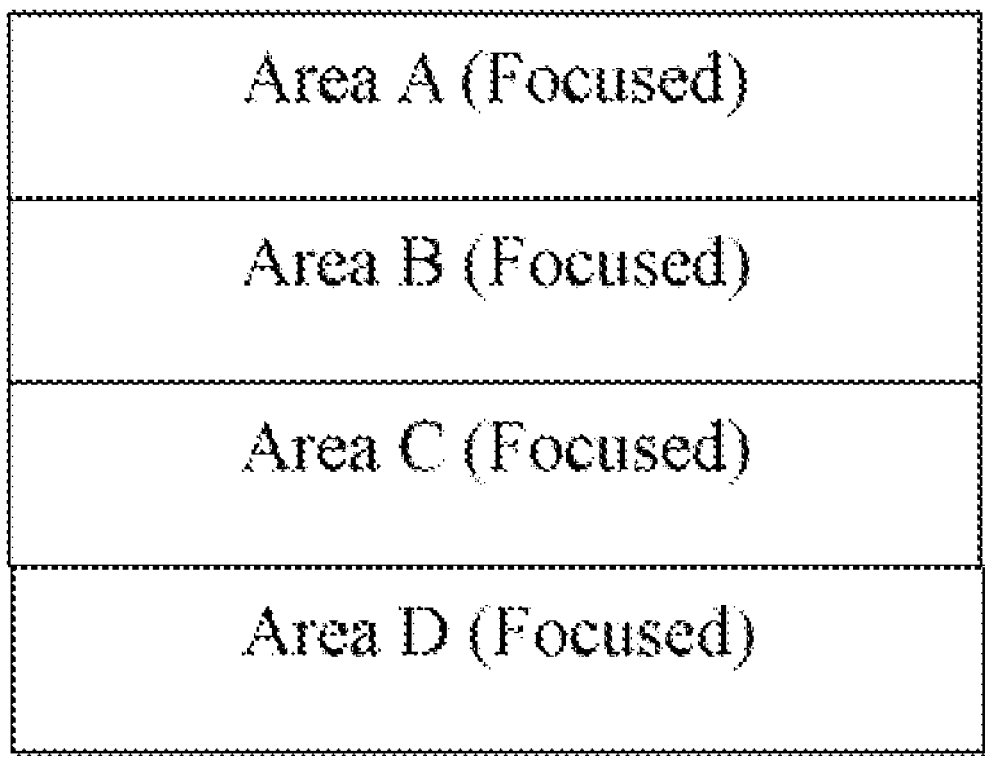
FIG. 11 is a schematic map showing an image coming from the merging of the differently focused images of the FIG. 7, FIG. 8, FIG. 9, and FIG. 10.

The object 5 is a workpiece with multiple layers. The first lever 2 and the second lever 3 are operated to move the platform 6 relative to the optical lens 8, the third lever 4 is operated to focus the optical lens on the object 5. In a focusing process, the image capture card 10 obtains the series of the differently focused images of the object 5. For example, the object 5 includes an area A, an area B, an area C and an area D. Each of the areas has different height. Referring to FIG. 7, FIG. 8, FIG. 9, and FIG. 10, each image has part that is at grade in focus. In FIG. 7, the area C is in focus. In FIG. 8, the area B is in focus. In FIG. 9, the area A is in focus. In FIG. 10, the area D is in focus. Referring to FIG. 11, the merge images program 11 merges the plurality of the differently focused images into an image in focus so that the four areas are in focus. During the focusing process, the object 5 is fixed on horizontal position.

In the preferred embodiment, each of the images is stored in a bitmap file (BMP). The bitmap file is eight bits but not limited to eight bits. The bitmap file may be 16 bits, 32 bits, i.e.

The BMP is a standard file format for computers running WINDOWS operating system. MICROSOFT developed the format for storing the bitmap files in a device-independent bitmap (DIB) format that will allow WINDOWS to display the bitmap on any type of a display device. The term "device independent" means that the bitmap specifies a pixel color in a form independent of the method used by a display to represent color.

Each bitmap file contains: a bitmap-file header and an array of bytes. The bitmap-file header contains information about a type, a size, and a layout of the device-independent bitmap file. The array of bytes defines a bitmap data. These are actual image data, represented by consecutive rows, or "scan lines", of the bitmap. Each scan line consists of consecutive bytes representing the pixels in the scan line, in a left-to-right order, a number of byte of each scan line is dependent on a number of image color and a horizontal width of the bitmap in pixels. Each of bytes contains a gray value of the pixel correspondingly. That is to say, a first byte in the array of bytes represents the gray value of the pixel at the bottom-left corner of the BMP file, last byte in the array of bytes represent the gray value of the pixel at the top-right corner of the BMP file, i.e. the gray values of the pixels in the BMP file store in bottom-to-top order, in left-to-right order.

In the preferred embodiment, the plurality of images measured by the same measuring machine 9 belongs to the same object 5, but the focus of each of the images is different. Each of the plurality of the differently focused images is stored in the BMP file; thus, the bitmap-file header of each of the images is the same. Because the focus of each of the images is different, the gray values of pixels of the array of bytes of each of the plurality of the differently focused images are different. If each of the plurality of the differently focused images is stored in one BMP file, it not only wastes memory space, but also wastes time to accessing the image during merging the differently focused images.

Figure 2:
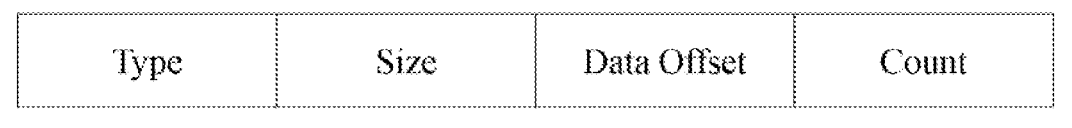

In the preferred embodiment, the plurality of the differently focused images is compressed into one file. The file is a compressed file. The compressed file includes one file header and the plurality of array of bytes of each of the images. The plurality of the differently focused images shares the file header in order to reduce the memory space on disk and reduce an access time while merging the differently focused images. Each of the plurality of the differently focused images has a bitmap data for storing the gray values of all of the pixels of the image. In fact, the bitmap data of the image is the array of bytes of the image. The array of bytes of each of the images is stored in the compressed file according to an order that the image captured by the CCD 7. A block diagram of the file header of the compressed file of the preferred embodiment is illustrated in FIG. 2. As shown in this figure, the file header mainly consists of following fields: a type filed, a size filed, a data offset filed, and a count filed. The type field stores a value representing that each of the images of the compressed file is in the bmp format. The size field specifies the size of each image of the compressed file in bytes; the size of each of the images of the plurality of the differently focused images is the same because that the same CCD 7 captures each of the image. The data offset field specifies an offset from the beginning of the compressed file to the beginning of the plurality of array of bytes of the images. The count field specifies a number of images of the compressed file.

Figure 3:
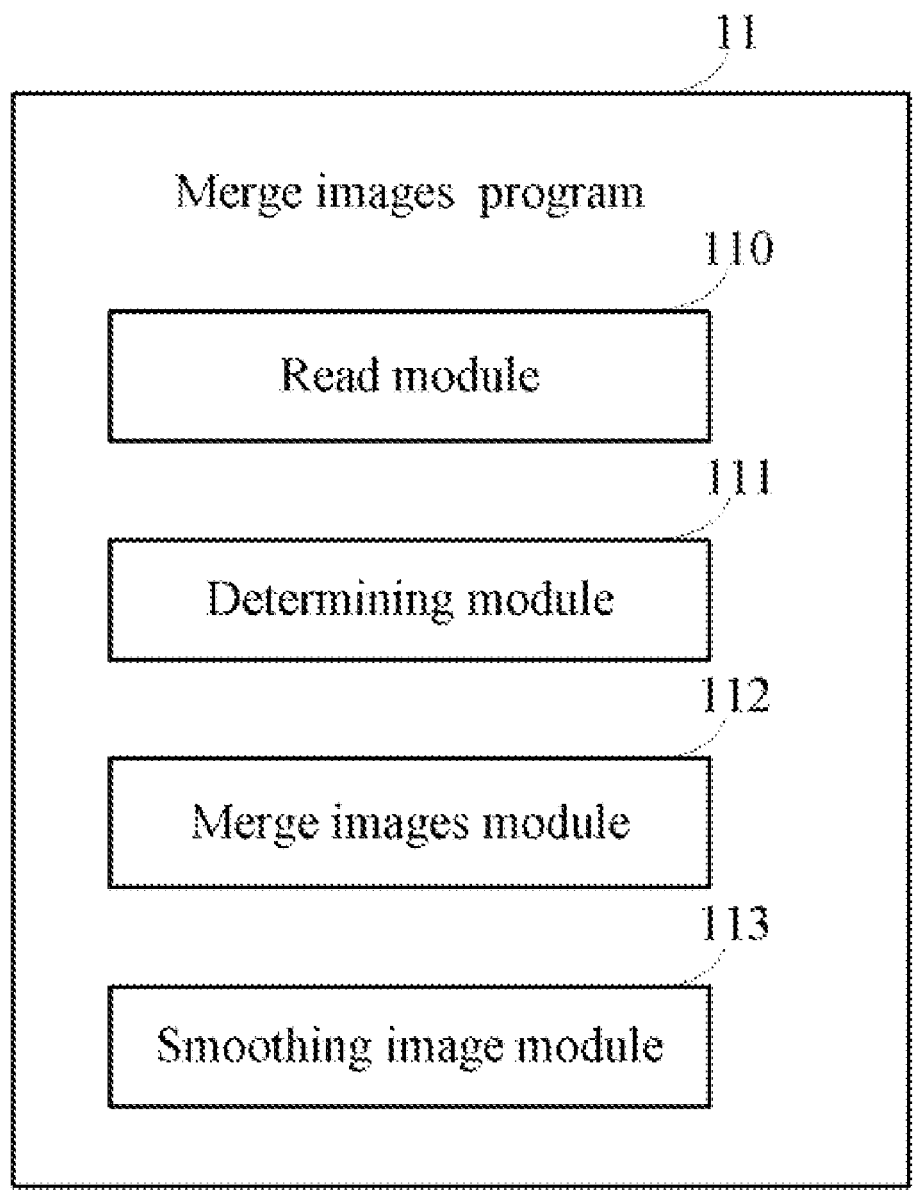
FIG. 3 is a schematic diagram of function modules of a merge images program in FIG. 1.

FIG. 3 is a schematic diagram of function modules of the merge images program 11 of FIG. 1. The merge images program 11 mainly includes a read module 110, a determining module 111, a merge images module 112, and a smoothing image module 113.

The read module 110 is configured for reading the differently focused images from the compressed file according to the number of the images, the size of each of the images, and the data offset, selecting one image as a first image (BMP), selecting another image as a next image (BMP0), and for reading the gray values of pixels in the read images.

The read module 110 is further configured for reading the number of the images in the compressed file from the count field of the file header, reading the bitmap data of one of the differently focused images once according to the data offset, the size of each of the images, and the number of the images, and computing a gradient of each of the pixels according to the gray values of the pixels of the image. The bitmap data of the image includes the array of bytes of the image; the array of bytes contains the gray values of each of the pixels of the image.

The determining module 111 is configured for determining whether the gradient of the pixel of the first image is less than the gradient of a corresponding pixel of the next image. The determining module 111 is further configured for determining whether the number of the images in the compressed file is less than one, determining whether the next image is a last image in the compressed file, and determining whether the extracted pixel from the first image is a last pixel of the first image.

The merge images module 112 is configured for merging the BMP0 into the BMP. That is to say, the merge images module 112 updates/replaces the gray value and the gradient of the pixel of the first image (BMP) with the gray value and the gradient of the corresponding pixel of the next image (BMP0) if the gradient of the pixel of the first image is less than the gradient of the corresponding pixel of the next image. The merge images module 112 is further configured for keeping the gray value and the gradient of the pixel of the first image if the gradient of the pixel of the first image is greater than or equals to the gradient of the corresponding pixel of the next image.

The smoothing image module 113 is configured for smoothing noises of the merged image with a technique of smoothing. The technique of smoothing may be mean filtering, median filtering and adaptive filtering.

Figure 4:
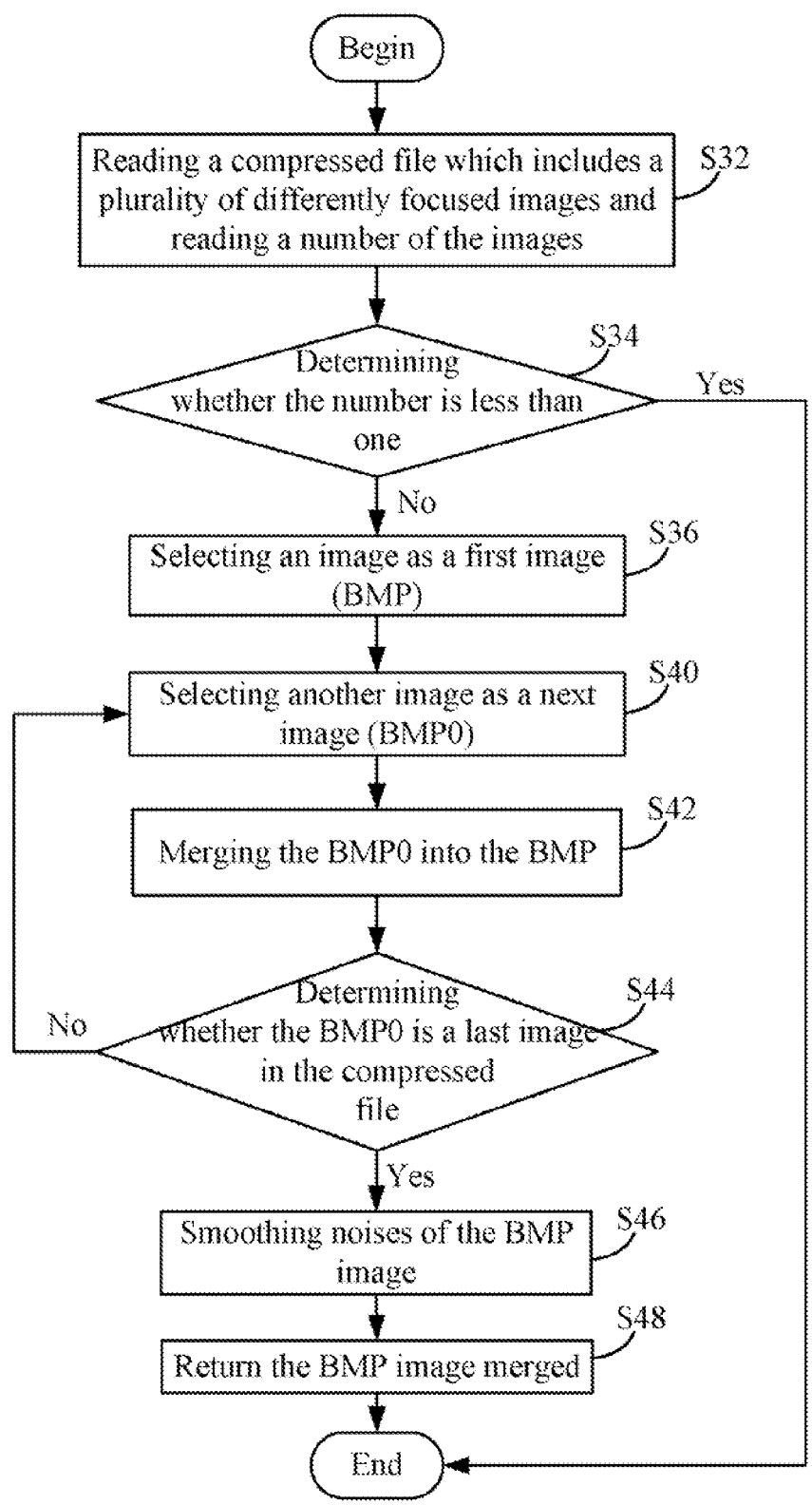
FIG. 4 is a flowchart of a preferred method for merging differently focused images in accordance with a preferred embodiment.

FIG. 4 is a flowchart of a preferred method for merging the differently focused images in accordance with a preferred embodiment. In step S32, the read module 110 reads the compressed file that includes the plurality of the differently focused images and reads the count field from the file header of the compressed file to obtain the number of the images of the compressed file.

In step S34, the determining module 111 determines whether the number of images is less than one. The procedure ends if the number is less than one. Otherwise, in step S36, the read module 110 selects one image of the plurality of the differently focused images as the first image (hereinafter, "the BMP") and reads the array of bytes of the selected image according to the data offset and the number of the images. The array of bytes contains the gray values of each of the pixels of the BMP.

In step S40, the read module 110 selects another image of the plurality of differently focused images as the next image (hereinafter, "the BMP0") and reads the array of bytes of the selected image according to the data offset and the number of the images. The array of bytes contains the gray values of each of the pixels of the BMP0.

In step S42, the merge images module 112 merges the BMP0 into the BMP.

In step S44, the determining module 111 determines whether the BMP0 is the last image in the compressed file. The procedure returns to step S40 if the BMP0 is not the last image in the compressed file.

In step S46, the smoothing image module 113 smoothes the noises of the BMP merged if the BMP0 is the last image in the compressed file. The step S46 for smoothing is the mean filtering, the median filtering, or the adaptive filtering.

In step S48, the display shows the merged BMP.

Figure 5:
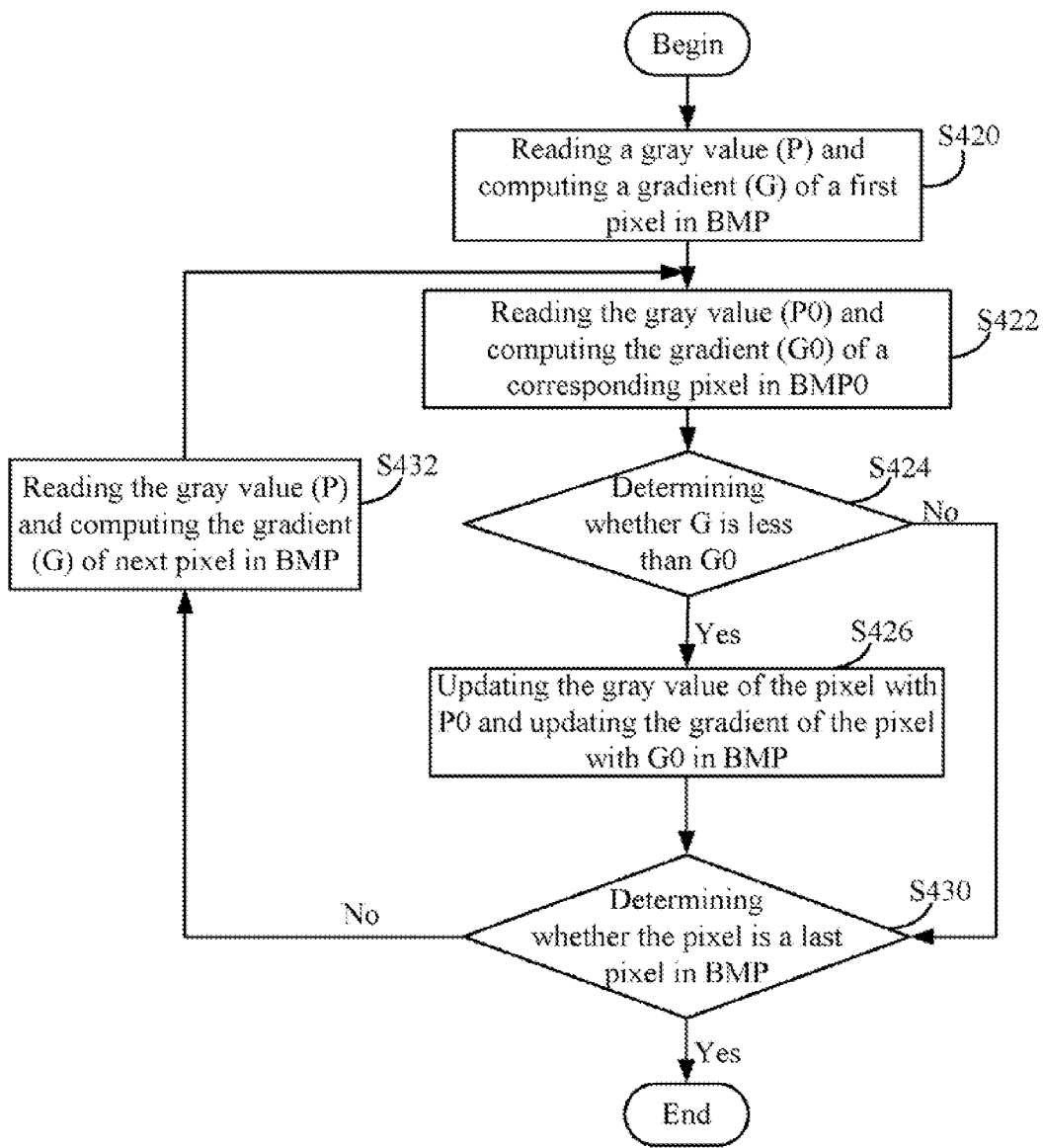
FIG. 5 is a flowchart illustrating step S42 of FIG. 4, namely merging the BMP0 into the BMP.

FIG. 5 is a flowchart illustrating step S42 in FIG. 4. In step S420, the read module 110 reads the gray value (hereinafter, "the P") of a first pixel of the BMP according to the order for storing in the array of bytes of the BMP. The read module 110 computes the gradient (hereinafter, "the G") of the first pixel of the BMP according to the P of the pixels of the BMP.

In step S422, the read module 110 reads the gray value (hereinafter, "the P0") of the corresponding pixel of the BMP0, and computes the gradient (hereinafter, "the G0") of the pixel according to the P0 of the pixels of the BMP0. The pixel of the BMP0 and the pixel of the BMP are one-to-one correspondence.

In step S424, the determining module 111 determines whether the G is less than the G0.

In step S426, the merge images module 112 updates/replaces the P with P0 and updates/replaces the G with G0 if the G is less than the G0. Otherwise, the merge images module 112 keeps the P and the G, and the procedure goes to step S430.

In step S430, the determining module 111 determines whether the pixel is the last pixel in the BMP. If the pixel is not the last pixel in the BMP, the procedure goes to the step S432. Otherwise, the procedure ends.

In step S432, the read module 110 reads the gray value of another pixel from the BMP and computes the gradient of the pixel. The procedure goes to step S422.

FIG. 5 is a sketch map illustrating step S46 in FIG. 4. The smoothing image module 113 smoothes noises of the merged image to enhance the quality of the image. The technique of smoothing may be the mean filtering, median filtering or adaptive filtering.

A pixel (6, 8) is smoothed filtering with the mean filtering method as below: the gray value of the pixel (6, 8) equals to the average of the gray values of a pixel (5, 7), a pixel (5, 8), a pixel (5, 9), a pixel (6, 7), a pixel (6, 8), a pixel (6, 9), a pixel (7, 7), a pixel (7, 8), and a pixel (7, 9).

The pixel (6, 8) is smoothed filtering with the median filtering method as below: the smoothing image module 113 sorts the gray values of the pixel (5, 7), the pixel (5, 8), the pixel (5, 9), the pixel (6, 7), the pixel (6, 8), the pixel (6, 9), the pixel (7, 7), the pixel (7, 8), and the pixel (7, 9) with ascending order or descending order, and extracts a median gray value of the gray values sorted as the gray value of the pixel (6, 8).

FIG. 7, FIG. 8, FIG. 9, and FIG. 10 are four schematic maps showing four differently focused images of the same object 5. The four images are captured from an electric socket connector with multiple layers. The four images are captured during focusing the electric socket connector on the measuring machine 9 and each image has part that is at grade in focus. In this preferred embodiment, the electric socket connector includes the area A, the area B, the area C and the area D. Each of the areas has different height. In FIG. 7, the area C is in focus. In FIG. 8, the area B is in focus. In FIG. 9, the area A is in focus. In FIG. 10, the area D is in focus. Referring to FIG. 11, the merge images program 11 merges the four differently focused images into an image in focus so that the four areas are in focus.

The invention not only apply to the measuring machine for capturing the differently focused images of the same object with multiple layers during focusing the object but also apply to for the rest, for instance, the invent uses for merging a plurality of differently focused images that captured from a thing through a manual focus camera which the thing and the camera are fixed.

It is to be understood that other embodiments may be utilized and structural changes may be made without departing from the scope of the present invention.

What is claimed is:

1. A system for merging differently focused images, the system comprising a measuring machine and a computer for obtaining a plurality of the differently focused images of an object disposed on the measuring machine, the plurality of differently focused images being stored in a compressed file and sharing a file header of the compressed file to reduce an access time while merging the differently focused images, the computer comprising a merge images program, the merge images program comprising:

a read module configured for reading the plurality of the differently focused images of the object disposed on the measuring machine, selecting an image of the plurality of the differently focused images as a first image, selecting another image of the plurality of the differently focused images as a next image, reading gray values of the pixels and computing a gradient of each pixel according to the gray values;

a determining module configured for determining whether the gradient of each of the pixels of the first image is less than the gradient of a corresponding pixel of the next image, determining whether the next image is a last image, and determining whether the read pixel is a last pixel of the first image;

a merge images module configured for obtaining a merged image by updating/replacing the gray value and the gradient of the pixel of the first image with the gray value and the gradient of the corresponding pixel of the next image if the gradient of the pixel of the first image is less than the gradient of the corresponding pixel of the next image, and by keeping the gray value and the gradient of the pixel of the first image if the gradient of the pixel in the first image is greater than or equal to the gradient of the corresponding pixel in the next image.

2. The system of claim 1, wherein the merge images program further comprises a smoothing image module for smoothing noises of the merged image.

3. The system of claim 1, wherein the computer further comprises an image capture card for receiving electrical signals of the plurality of the differently focused images of the object transmitted from the measuring machine.

4. The system of claim 1, wherein each of the plurality of the differently focused images is stored in a bitmap file.

5. The system of claim 1, wherein each of the plurality of the differently focused images has a bitmap data for storing the gray values of all of the pixels of the image.

6. The system of claim 1, wherein the file header comprises:
   a type field for storing an value representing that each of the images of the compressed file is in the bmp format;
   a size field for specifying the size of each image of the compressed file in bytes;
   a data offset field for specifying an offset from the beginning of the compressed file to the beginning of the plurality of array of bytes of the images; and
   a count field for specifying a number of images of the compressed file.

7. The system of claim 6, wherein the read module reads the bitmap data of one of the plurality of the differently focused images according to the size, the data offset, and the number of images of the file header, and computes the gradient of each of the pixels according to the gray value of the pixel of the image.

8. A computer-based method for merging differently focused images, the method comprising:
   reading a plurality of the differently focused images of an object with multiple layers, the object being disposed on a measuring machine, the plurality of differently focused images being stored in a compressed file and sharing a file header of the compressed file to reduce an access time while merging the differently focused images;
   selecting one of the differently focused images as a first image;
   selecting another one of the differently focused images as a next image;
   reading a gray value (P) and a gradient (G) of a pixel from the first image;
   reading the gray value (P0) and the gradient (G0) of a corresponding pixel from the next image;
   updating/replacing the gray value of the pixel of the first image with the gray value (P0) of the corresponding pixel of the next image and updating the gradient of the pixel of the first image with the gradient (G0) of the corresponding pixel of the next image if the gradient (G) of the pixel of the first image is less than the gradient (G0) of the corresponding pixel of the next image;
   keeping the gray value (P) and the gradient (G) of the pixel of the first image if the gradient (G) of the pixel of the first image is greater than or equal to the gradient (G0) of the corresponding pixel of the next image;
   returning to the step of reading the gray value (P) and the gradient (G) of the pixel from the first image until all of the pixels of the first image are either kept or replaced; and
   returning to the step of selecting another one of the differently focused images as the next image until reading over all the images to obtain a merged image.

9. The method of claim 8, further comprising the step of: smoothing noises of the merged image.

10. The method of claim 8, wherein each of the plurality of the differently focused images is stored in a bitmap file.

11. The method of claim 8, wherein each of the plurality of the differently focused images has a bitmap data for storing the gray values of all of the pixels of the image.

12. The method of claim 8, wherein the file header comprises:
   a type field for storing an value representing that each of the images of the compressed file is in the bmp format;
   a size field for specifying the size of each image of the compressed file in bytes;
   a data offset field for specifying an offset from the beginning of the compressed file to the beginning of the plurality of array of bytes of the images;
   a count field for specifying a number of images of the compressed file.

13. The method of claim 11, wherein the step of selecting one image or selecting another image reads all of the bitmap data of one of the differently focused images once and computing the gradient of each of the pixels according to the gray value of the pixel of the image.

* * * * *